April 28, 1953  C. G. KERR  2,636,419

REARVIEW MIRROR

Filed March 31, 1951

INVENTOR
CHARLES G. KERR
BY
Charles S. Evans
his ATTORNEY

Patented Apr. 28, 1953

2,636,419

UNITED STATES PATENT OFFICE 2,636,419

REARVIEW MIRROR

Charles G. Kerr, San Rafael, Calif.

Application March 31, 1951, Serial No. 218,639

1 Claim. (Cl. 88—98)

My invention relates to rear view mirrors, and particularly to an auxiliary mirror for extending the field of rearward vision.

One of the objects of the invention is the provision of such a mirror which permits a more extensive coverage of the traffic lane on the right, and of cars approaching from the rear in that lane.

Another object is the provision of a simple mounting structure by which my auxiliary mirror without the use of tools, may be secured in place upon the main rear view mirror, so that the two may function together to give adequate coverage of the traffic lanes behind.

Every driver of a motor car realizes that traffic conditions to the right and rear of his own car constitute major hazards to his safety whenever he is on the highway. Various arrangements of rear view mirrors are available, but high cost, difficulty of installation, bulkiness and inconvenience characterize many of them. It has been my purpose to provide a rear view mirror inconspicuous in size, but effective in reflecting the very dangerous area not generally included in the main mirror relied on for rear views, and in such simple and readily attached form as to encourage wide adoption and use.

According to my invention, this has been accomplished by the provision of a small mirror on a mounting readily and inconspicuously attachable to the main rear view mirror, commonly found centrally above the windshield in motor cars. These main mirrors are excellent for reflecting the traffic lanes to the rear in direct line and to the left side, but are incapable because of the angle of their setting, of also reflecting near traffic to the rear and at the right.

In the mounting of my auxiliary mirror, I provide for the required angle of setting so that when the plane of the main mirror is adjusted to give the best coverage of the traffic lanes directly behind and to the left, my auxiliary mirror lies in the plane necessary for best coverage of the lane to the right and close behind, so that traffic conditions behind and on both sides of the car are constantly revealed.

Figure 1:
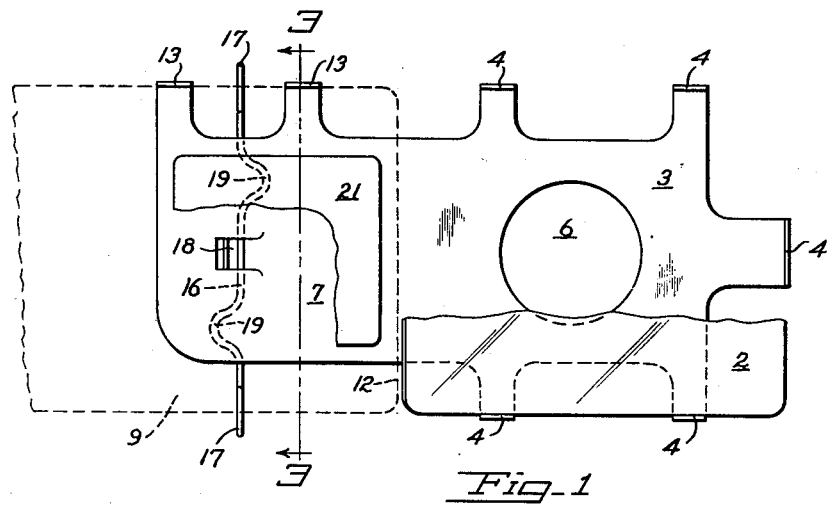
Figure 2:
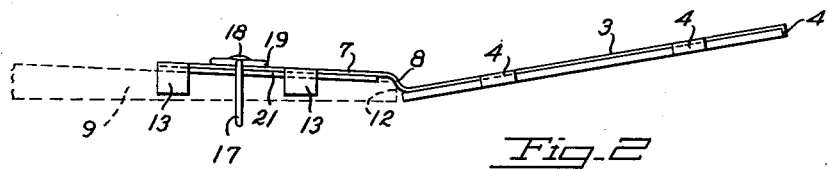
Figure 3:
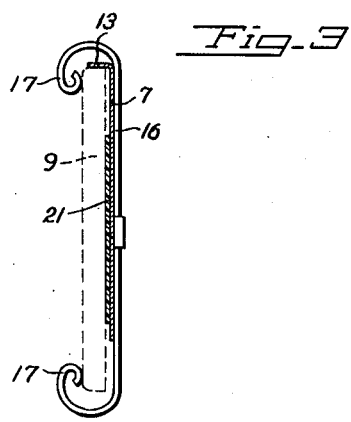

Referring to the drawings: Fig. 1 is an elevation of my auxiliary mirror mounted in position of use on the end of the main mirror which is shown in dashed lines. Only the lower part of the auxiliary mirror glass is shown, the remainder being broken away to disclose the underlying backing plate. Fig. 2 is a top view of the structure shown in Fig. 1. Fig. 3 is a vertical sectional view taken in the plane indicated by the line 3—3 of Fig. 1.

My auxiliary mirror comprises a reflector 2, preferably a glass plate silvered on the rear side, and held on the backing plate 3 between the lugs or flanged tabs 4, integrally extending from the backing plate.

Because it is desirable to reduce the weight to a minimum, the main body of the backing plate is made smaller than the reflector; and the tabs 4 extend outwardly and around the edge of the reflector as shown. The structure may be further lightened by a central aperture 6. A light gauge of mild steel plate is preferred as giving the best combination of lightness and stiffness.

Along the left edge of the reflector, as shown in Fig. 1, the backing plate is provided with an integral arm 7, offset a small amount, to the rear, as at 8; and then continued in a plane making a small angle with the plane of the backing plate.

This angle is a critical one and is adjusted to final or permanent value with each installation of my mirror, to conform with the specific conditions of that installation, including angle of setting on its own bracket of the main rear view mirror 9, and structural details of the vehicle. The adjustment is made by a slight corrective bending at the offset portion 8, which can readily be done by firm finger pressure. Once bent to the proper angle, no further adjustment or change is required.

Means are provided on the arm 7 for affording simple and easily manipulated securement to the right end of the main rear view mirror structure. The offset portion 8 provides a shoulder against which the right hand edge 12 of the main mirror structure may seat; and flanged tabs 13 spaced across the upper edge of the arm are arranged to engage the upper edge of the main mirror structure.

It then remains to provide means to keep the shoulder 8 against the main mirror structure and the tabs 13 from slipping. Such means is provided by the wire spring 16, having curled-over ends 17, proportioned to curve over the upper and lower edges of the main mirror and resiliently engage its front surface as shown in Fig. 3. The spring is secured along its middle portion to the arm 7, by being pinched strongly under the tongue 18, struck integrally from the central area of the arm. Oppositely extending shallow bows 19, lying in a plane at right angles with the ends 17 prevent turning of the spring.

With engagement of the spring ends over the main mirror structure as shown in Figs. 1 and 2, the two reflecting mirrors give an adequate coverage of traffic approaching from the rear. Minor adjustment of the angular setting of the auxiliary mirror may be made if necessary by slipping the arm 7 off of the main mirror and bending it slightly at the shoulder, then remounting in the position shown.

In order to dampen any vibration occurring between the two mirrors, and obtain better fixity of position, it is advisable to insert a small sheet of thin rubber, blotting paper or similar cushioning pad 21 between the mounting arm 7 and the back of the main mirror. Rubber, cemented to the arm 7 is preferred for this.

I claim:

An auxiliary rear view mirror for attachment to a main rear view mirror comprising a reflector, a plate for mounting the reflector and extending to one side thereof in an arm offset from the plate to provide a shoulder to seat against an edge of the main mirror and having means thereon for securement to the main mirror, said means comprising a spring fixed between its ends to the rear face of the arm and having its ends shaped to extend about upper and lower edges of the main mirror to engage the front face thereof, stops on the upper edge of the arm to engage the upper edge of the main mirror, and a cushioning pad on the front face of the arm to engage the rear face of the main mirror.

CHARLES G. KERR.

References Cited in the file of this patent
UNITED STATES PATENTS

| Number | Name | Date |
|---|---|---|
| 1,629,458 | Jassen | May 17, 1927 |
| 1,647,803 | La Hodny et al. | Nov. 1, 1927 |
| 1,895,560 | Wier | Jan. 31, 1933 |
| 1,969,415 | Ostroff | Aug. 7, 1934 |
| 1,991,363 | La Hodny et al. | Feb. 19, 1935 |
| 2,097,419 | Schmidt | Oct. 26, 1937 |
| 2,261,301 | Smith | Nov. 4, 1941 |
| 2,582,651 | Peterson | Jan. 15, 1952 |
| 2,605,676 | Couch | Aug. 5, 1952 |